(12) United States Patent
Jayachand

(10) Patent No.: US 12,377,742 B2
(45) Date of Patent: Aug. 5, 2025

(54) SYSTEMS AND METHODS FOR ENERGY TRANSFER FOR ELECTRICAL VEHICLES

(71) Applicant: Hummingbird EV, Livermore, CA (US)

(72) Inventor: Vinay Jayachand, Dublin, CA (US)

(73) Assignee: Hummingbird EV, Livermore, CA (US)

( * ) Notice: Subject to any disclaimer, the term of this patent is extended or adjusted under 35 U.S.C. 154(b) by 449 days.

(21) Appl. No.: 17/895,878

(22) Filed: Aug. 25, 2022

(65) Prior Publication Data

US 2023/0062531 A1 Mar. 2, 2023

Related U.S. Application Data

(60) Provisional application No. 63/237,462, filed on Aug. 26, 2021.

(51) Int. Cl.
*B60L 53/22* (2019.01)
*B60L 53/62* (2019.01)

(52) U.S. Cl.
CPC ............... *B60L 53/22* (2019.02); *B60L 53/62* (2019.02)

(58) Field of Classification Search
CPC .......... B60L 53/22; B60L 53/62; B60L 53/24; B60L 53/57; B60L 2210/30; B60L 3/0069; B60L 2210/42; Y02T 10/70; Y02T 10/7072; Y02T 90/12; Y02T 90/14
USPC ......................................................... 320/109
See application file for complete search history.

(56) References Cited

U.S. PATENT DOCUMENTS

| | | | |
|---|---|---|---|
| 2015/0274026 A1 | 10/2015 | Rippel et al. | |
| 2016/0144729 A1 | 5/2016 | Huang | |
| 2019/0092178 A1* | 3/2019 | Zhu | H02P 5/747 |
| 2019/0092180 A1 | 3/2019 | Zhu | |
| 2021/0408889 A1* | 12/2021 | Zhu | H02J 7/02 |
| 2022/0194239 A1* | 6/2022 | Zhu | H02J 7/02 |
| 2023/0202320 A1* | 6/2023 | Facanha | H02M 3/01 |
| | | | 701/22 |

FOREIGN PATENT DOCUMENTS

EP 3006254 A1 10/2015
KR 20160052134 A 5/2016

OTHER PUBLICATIONS

Hummingbird EV, International Search Report and Written Opinion, PCT/US2022/041708, Dec. 9, 2022, 7 pgs.

* cited by examiner

*Primary Examiner* — Paul Dinh
(74) *Attorney, Agent, or Firm* — Morgan, Lewis & Bockius LLP

(57) ABSTRACT

An electrical system for distribution of electrical power is described. The electrical system may include a polyphase motor, a direct current (DC) to alternating current (AC) converter electrically coupled to an electrical power source and the polyphase motor to provide electrical power from the electrical power source to the polyphase motor, and one or more AC-to-DC converters electrically coupled to the polyphase motor to receive electrical power from the polyphase motor. A method for transferring an electrical power from an electrical power source to one or more devices is also described.

20 Claims, 8 Drawing Sheets

006
SYSTEMS AND METHODS FOR ENERGY TRANSFER FOR ELECTRICAL VEHICLES

PRIORITY AND RELATED APPLICATIONS

This application claims priority to U.S. Provisional Patent Application No. 63/237,462, filed Aug. 26, 2021, entitled "Electrical Systems for Energy Transfer for Electrical Vehicles," which is incorporated by reference herein in its entirety.

TECHNICAL FIELD

The disclosed embodiments relate generally to electric vehicle charging methods and systems, including but not limited to, on-board charging systems for electric vehicles, electric vehicle charging stations, and electric vehicle charging facility management methods and systems.

BACKGROUND

Electric vehicles are becoming increasingly prevalent, accounting for a growing share of vehicles in the market. However, the limited availability of electric vehicle charging stations and the limited speeds at which electric vehicles can be charged present barriers to more widespread adoption of electric vehicles. As a result, owners of electric vehicles must plan their routes carefully so that they have enough energy from the battery to reach their destinations.

Installing a large number of charging stations may partially alleviate the range anxiety. However, installing the large number of charging stations can be costly. In addition, in order to ensure that all installed high power charging stations function as expected, a large amount of grid resources must be reserved for the charging facility that provides the charging stations. The large amount of reserved grid resources often goes underutilized, resulting in waste and inefficiencies in energy management by the electricity providers. Furthermore, the un-recouped economic costs for maintaining the grid reserves for a charging facility prohibits the wide infrastructure development needed to make electric vehicles a more prevalent and useful mode of transportation today.

Accordingly, there is a need for lower cost, more efficient, and more user-friendly charging facilities and charging stations to help with quicker and wider adoption of electric vehicles and protection for the environment.

SUMMARY

Electric vehicles (EV) are a potential source of energy (e.g., at specific power levels). Therefore, EVs can be used to export power to another vehicle or power system. The systems and methods described herein include mechanisms to enable sharing of power between sources of direct current (DC) power systems, e.g., a battery or energy storage system (ESS), that may be mobile or stationary. As described in detail below, the mechanisms include a safe and secure electrical medium and a communication protocol. For example, the power transfer rates for the power sharing can be mutually decided using the communication protocol. Additionally, the mechanisms described herein operate with a variety of voltages (e.g., are independent of voltage) and a variety of ESS (e.g., are independent of ESS types). The DC power systems can be stationary or mobile systems and the power transfer can be a bi-directional DC transfer. Moreover, the systems and methods described herein can be used to concurrently charge multiple ESS (e.g., multiple EVs).

In accordance with some embodiments, an electrical system includes a polyphase motor; a direct current (DC) to alternating current (AC) converter electrically coupled to an electrical power source and the polyphase motor to provide electrical power from the electrical power source to the polyphase motor; and one or more AC-to-DC converters electrically coupled to the polyphase motor to receive electrical power from the polyphase motor.

In accordance with some embodiments, a method includes transferring an electrical power from an electrical power source to one or more devices by: operating a polyphase motor with the electrical power from the electrical power source; and generating electrical power using the polyphase motor and providing the generated electrical power to the one or more devices.

The above deficiencies and other problems associated with electric vehicle charging systems, charging stations, and charging facilities are reduced or eliminated by the systems and methods disclosed herein. Various embodiments of systems, methods, devices, and non-transitory computer-readable storage media within the scope of the appended claims each have several aspects, no single one of which is solely responsible for the attributes describe herein. Without limiting the scope of the appended claims, after considering this disclosure, and particularly after considering the section entitled "Detailed Description," one will understand how the aspects of various embodiments are used to provide improved electric vehicle charging and improved charging facility management.

BRIEF DESCRIPTION OF THE DRAWINGS

In order that the present disclosure can be understood in greater detail, a more particular description is made in reference to the features of various embodiments, some of which are illustrated in the appended drawings. The appended drawings, however, merely illustrate the more pertinent features of the present disclosure and are therefore not to be considered limiting, for the description may admit to other effective features.

Figure 1:
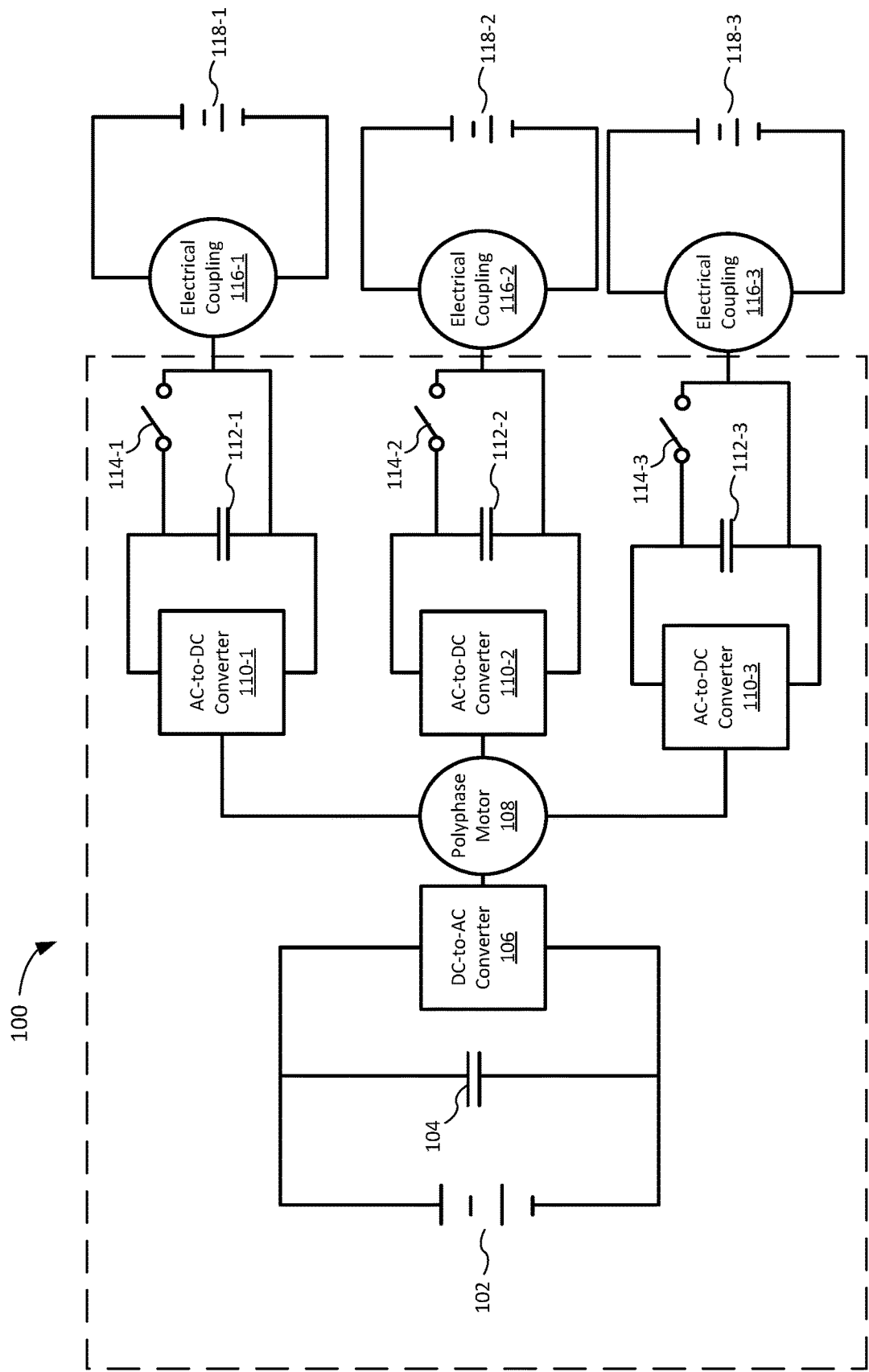
FIG. 1 is a schematic diagram illustrating an example electrical system for power transfer between ESSs in accordance with some embodiments.

In accordance with common practice, the various features illustrated in the drawings may not be drawn to scale.

Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Reference will now be made in detail to embodiments, examples of which are illustrated in the accompanying drawings. In the following detailed description, numerous non-limiting specific details are set forth to assist in understanding the subject matter presented herein. It will be apparent, however, to one of ordinary skill in the art that various alternatives may be used without departing from the scope of the claims, and that the subject matter may be practiced without these specific details. In other instances, well-known methods, procedures, components, circuits, and systems have not been described in detail so as not to unnecessarily obscure aspects of the embodiments. In addition, features described with respect to particular embodiments, may be combined with features described with respect to other embodiments without limitation, unless explicitly stated otherwise.

As described above, state-of-the-art electric vehicle charging facilities are expensive to build and maintain due to the special requirements on equipment and infrastructure support. For example, high power charging stations require large transformers, high amperage power lines, high amperage circuit breakers, as well as other specialized safety mechanisms to be installed based on anticipated charging demands. Various types of charging equipment (e.g., electric connectors and information exchange mechanisms) are needed to accommodate different types of electric vehicles and different types of on-board charging systems (e.g., AC charging, DC charging, and other types of proprietary charging styles). Each charging station also needs specially designed security and user interface equipment (e.g., display, input system, payment system, encryption system, etc.) to receive payment information and user authorizations.

In addition to the fixed cost of purchasing and installing the charging station equipment, the daily operational cost of a charging facility is also very high. For example, in order to keep up with variations of electricity demand over time (e.g., day to day, month to month, etc.), the utility companies maintain electricity reserves for each large electricity demand center, and typically charge a fee for such reserves. Frequently, the utility companies charge for this reserve in the form of a "line charge" which is calculated based on the maximum electricity usage level that has occurred during an electricity consumption cycle (e.g., weekly, monthly, quarterly, or annually). The greater the peak electricity consumption for an electricity demand center is, the greater the line charge for the electric demand center is. An electricity vehicle charging facility incurs this "line charge" for the electricity reserve that is maintained on its behalf by the utility company, even if the charging facility does not dispense electricity anywhere near the peak level for a majority of the time during an electricity consumption cycle for which the "line charge" is exacted. This extra "line charge" makes many facility managers reluctant to build and operate electric vehicle charging facilities on their properties.

Presently, large electricity demand centers, such as industrial facilities, shopping malls, office buildings, hospitals, stadiums, storage and distribution centers, large chain stores, and other public and commercial venues, enjoy the electricity reserves provided by the utility companies, and in turn each pay a corresponding "line charge" for these reserves. The actual electricity consumptions for these large electricity demand centers are often cyclic, with large peak electricity demand occurring for only a short amount of time in a demand cycle (e.g., a day, or a week, or a month, etc.), followed by long periods of much lower demand levels. There is therefore great incentive and interest for the large electricity demand centers to utilize the grid reserve during the off-peak demand hours.

As described herein, an electrical vehicle with at least a partially charged battery may be used to as a source of energy. Thus, such electrical vehicle may be used to power (or charge) other electrical vehicles.

Using the electrical systems described herein, a first electrical vehicle may be connected to a second electrical vehicle for charging the second electrical vehicle. In some embodiments, the electrical system provides isolation between the energy storage system (e.g., a battery) of the first electrical vehicle and the energy storage system (e.g., a battery) of the second electrical vehicle. In some embodiments, the medium of power transfer between the source and destination systems is through a plug and cable assembly. In some embodiments, the medium of power transfer between the source and destination systems is via a controlled power distribution system. Such electrical system may also be used for coupling an electrical vehicle to a charging station.

FIG. 1 is a schematic diagram illustrating an electrical system 100 coupled with destination energy storage systems (ESSs) 118 (e.g., three target vehicles) in accordance with some embodiments. The electrical system 100 includes an energy source 102 (e.g., an ESS) and a motor 108 (e.g., a polyphase motor). In some embodiments, the energy source 102 is a source of energy and power for direct current (e.g., independent of cell chemistry). In some embodiments, the motor 108 comprises a stator core and stator windings in three phases (e.g., A, B, C or U, V, W). In some embodiments, the motor 108 is an induction motor. In some embodiments, the motor 108 is a permanent magnet synchronous motor (PMSM).

In some embodiments, the energy source 102 is coupled to a capacitor 104 (e.g., a DC link capacitor) as shown in FIG. 1. In some embodiments, the DC power from the energy source 102 is converted to AC power using a DC-to-AC converter 106 (also sometimes called a master inverter). For example, the DC-to-AC converter 106 provides an AC output for activating the motor 108. In some embodiments, the DC-to-AC converter is a polyphase converter, e.g., the motor 108 is a 3-phase motor and the DC-to-AC converter 106 is a 3-phase DC-to-AC converter. In some embodiments, the DC-to-AC converter 106 is configured to drive selected windings of the motor 108.

The motor 108 is coupled with one or more AC-to-DC converters 110 (e.g., in FIG. 1, the motor is coupled with the AC-to-DC converters 110-1, 110-2, and 110-3) so that an electrical output from the one or more AC-to-DC converters 110 may be used for charging one or more destination ESSs 118 (e.g., vehicles). For example, a switch 114-1 may be closed to charge the ESS 118-1 (e.g., a vehicle or device), a switch 114-2 may be closed to charge the ESS 118-2, and a switch 114-3 may be closed to charge the ESS 118-3. In some embodiments, the switches 114 comprise one or more of: a metal-oxide-semiconductor field-effect transistor (MOSFET), a silicon-carbide (SiC) device, or an insulated gate bipolar transistor (IGBT) device.

In some embodiments, the AC-to-DC converters 110 are coupled with respective capacitors 112 (e.g., the AC-to-DC converter 110-1 is coupled with the capacitor 112-1, the AC-to-DC converter 110-2 is coupled with the capacitor 112-2, and the AC-to-DC converter 110-3 is coupled with the capacitor 112-3). In some embodiments, the capacitors 112 are DC link capacitors. In some embodiments, the AC-to-DC converter 110-1, the AC-to-DC converter 110-2, and the AC-to-DC converter 110-3 control and regulate the current provided to the destination ESSs 118. The AC-to-DC converters 110 are coupled to the destination ESSs 118 through electrical couplings 116 (e.g., a power distribution medium, such as a cable-and-plug assembly or busbars). In some embodiments, the AC-to-DC converters 110 operate in a current control mode so as to regulate current levels (e.g., to not to exceed the target levels associated with destination ESSs 118). In some embodiments, the DC-to-AC converter 106 and the AC-to-DC converters 110 are setup as three half-bridge networks (e.g., as discussed in more detail with respect to FIG. 5). In some embodiments, the DC-to-AC converter 106 limits charge rates on the AC-to-DC converters 110 based on one or more parameters (e.g., ambient temperature, cell temperature, etc.).

As shown in FIG. 1, there is no direct electrical connection between the energy source 102 and the destination ESSs 118 (e.g., isolation is achieved via the motor 108 so that any DC signal applied to the motor 108 from the DC-to-AC converter 106 is suppressed from transmission to the AC-to-DC converters 110), although the line between the DC-to-AC converter 106 and the motor 108 and a line between the motor 108 and any of the AC-to-DC converters 110 may be magnetically coupled (via one or more components of the motor 108, such as coils or windings). As described further with respect to FIG. 4, the motor 108 provides electrical isolation between a power line from the energy source 102 and a power line to a destination ESS 118. In this way, an electrical isolation fault or short circuit condition at one ESS device will not adversely impact the other ESSs.

In some embodiments, the DC-to-AC converter 106 is a bidirectional DC-to-AC converter (e.g., the DC-to-AC converter 106 may operate as an AC-to-DC converter, converting the AC power from the motor 108 to the DC power). In some embodiments, the AC-to-DC converters 110 are bidirectional AC-to-DC converters (e.g., the AC-to-DC converters 110 may operate as DC-to-AC converters, converting the DC power from ESSs 118 to the AC power). The combination of bidirectional converters (e.g., the bidirectional DC-to-AC converter and the bidirectional AC-to-DC converters) allows bidirectional transfer of electrical powers between the energy source 102 and the ESSs 118 (e.g., from the energy source 102 to the ESSs 118 and also from the ESSs 118 to the energy source 102).

Figure 2:
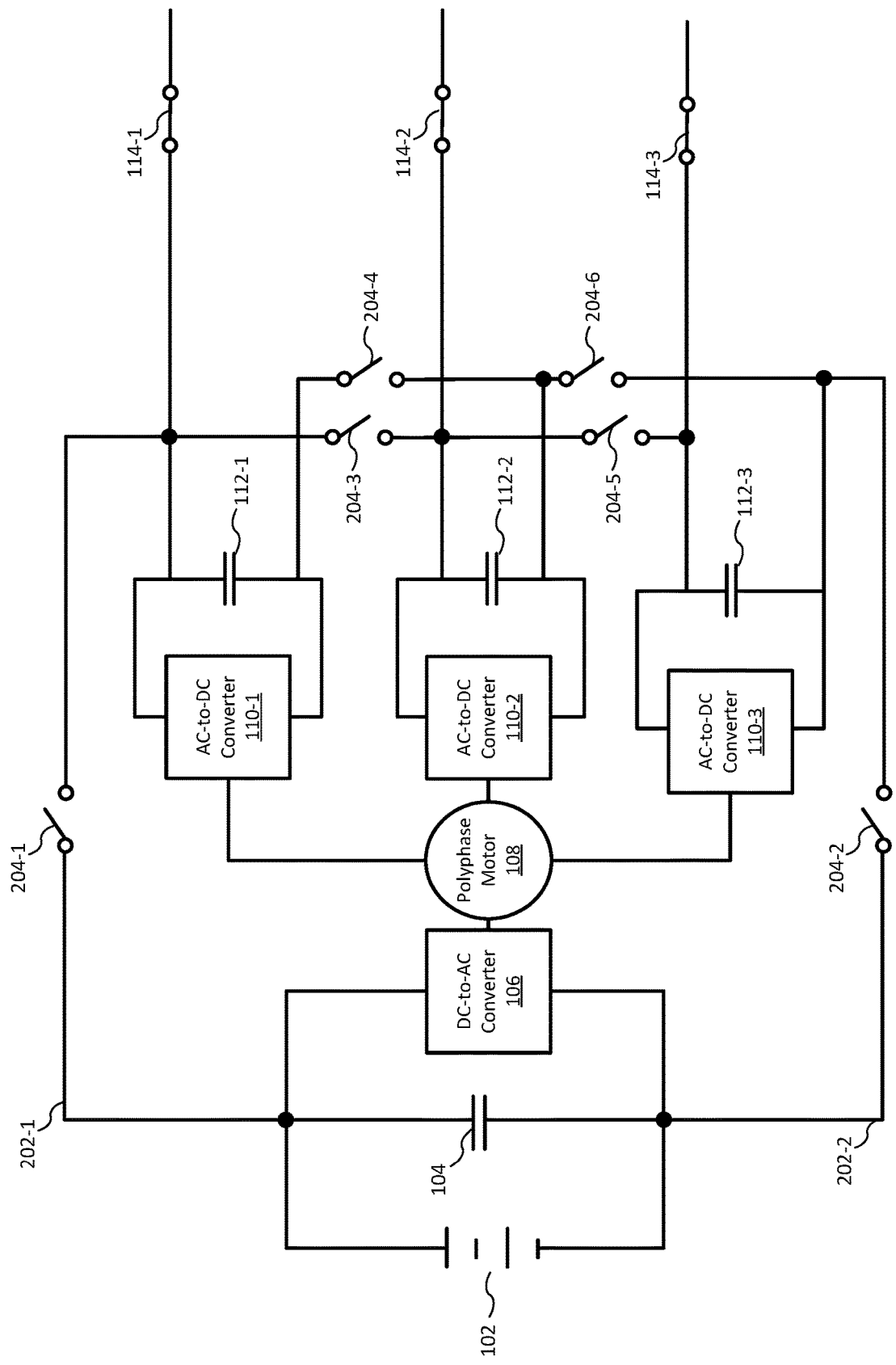
FIG. 2 is a schematic diagram illustrating an example electrical system in a charging mode in accordance with some embodiments.

FIG. 2 is a schematic diagram illustrating an electrical system in a charging mode in accordance with some embodiments. The electrical system shown in FIG. 2 is similar to the electrical system 100 described with respect to FIG. 1, except that the electrical system shown in FIG. 2 includes electrical lines 202 and switches 204. While the electrical system is used to charge one or more ESSs (e.g., in the charging mode), the switches 204 are open so that electrical outputs provided by the AC-to-DC converters 110 remain separate from one another and from the energy source 102.

In some embodiments, the DC-to-AC converter 106 drives stator winding phases (e.g., A1, B1, and C1 illustrated in FIG. 4) in the motor 108 using a half-bridge switch network. In some embodiments, the DC-to-AC converter 106 is configured to maintain a constant rotations per minute (RPM) at the motor 108 (e.g., at a maximum preset level for the motor 108). In this way, a stator back electromagnetic field (EMF) is built up along the magnetizing axis of each phase. The isolated winding sets in the motor 108 (e.g., set A2, B2, and C2 in FIG. 4) may experience a substantially similar back EMF as they are magnetically coupled to the same rotor. The similar back EMF improves power transfer from the master winding set to the slave winding set.

In some embodiments, the AC-to-DC converters 110 re-generate AC power from the slave winding sets to DC power to charge the capacitors 112 and independently control current to the destination ESSs 118. In some embodiments, the AC-to-DC converters 110 control and regulate the current flowing to the respective destination ESSs 118. In some embodiments, the AC-to-DC converters 110 operate as generators in a current control mode. In this way, the AC-to-DC converters 110 can precisely regulate current levels as requested (and not exceed the target levels set) by the respective destination ESSs 118. In some embodiments, the AC-to-DC converters 110 are assigned priority (e.g., by the DC-to-AC converter 106 or a control component not shown) based on charge levels and other factors (e.g., cost, ESS identifier, and the like).

In some embodiments, the DC-to-AC converter 106 limits charge rates of destination ESSs 118 based on properties or limits of the energy source 102 (e.g., ambient temperature, cell temperature, discharge current limits, and the like).

Figure 3:
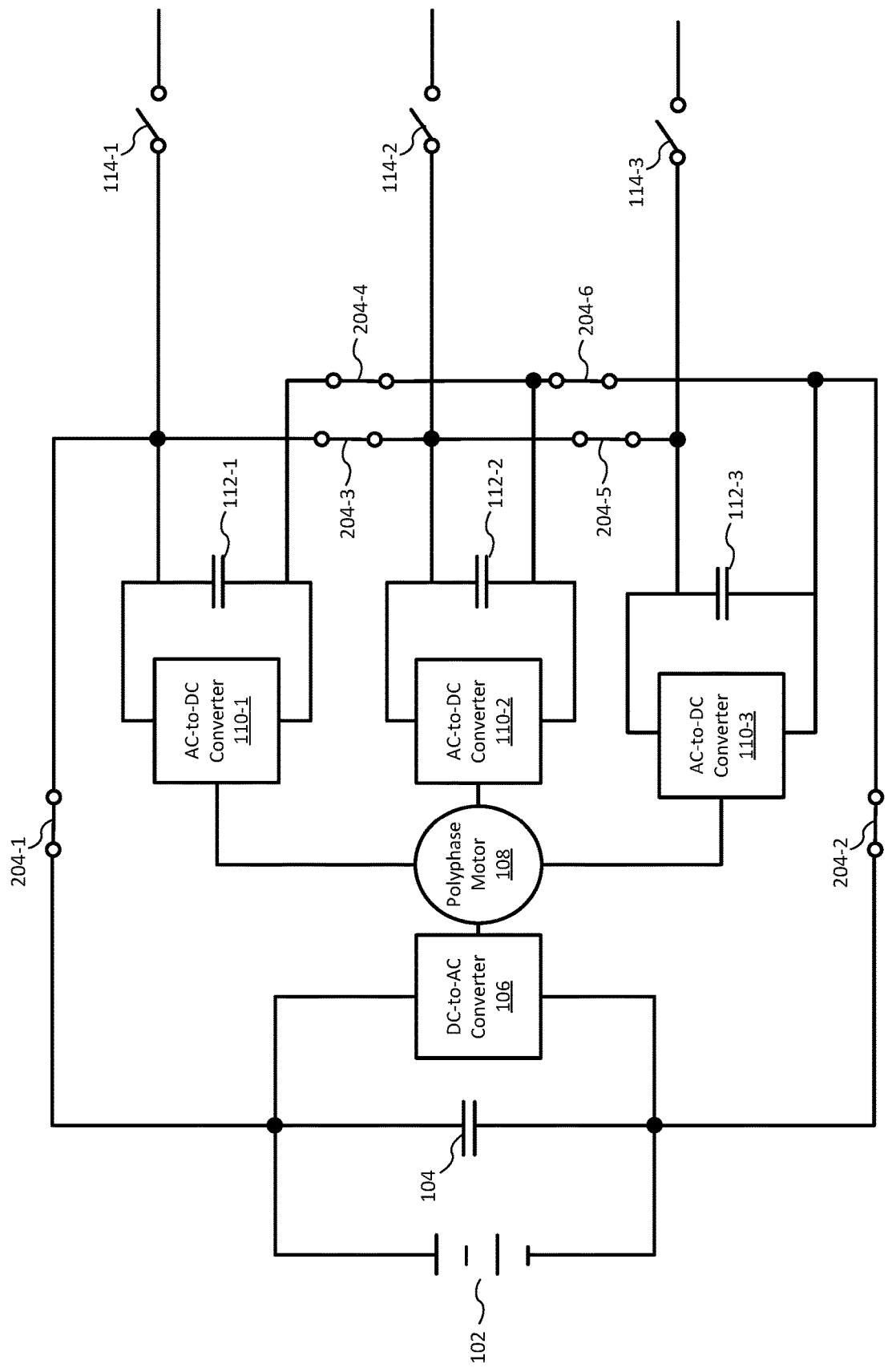
FIG. 3 is a schematic diagram illustrating an example electrical system in a drive mode in accordance with some embodiments.

FIG. 3 is a schematic diagram illustrating an electrical system in a drive mode in accordance with some embodiments. The electrical system shown in FIG. 3 is similar to the electrical system described with respect to FIG. 2, except that the switches 114 are open and the switches 204 are closed. For example, FIG. 3 shows that a source vehicle can switch from a charge mode to a drive mode and reuse the same components used for charge. Closing the switches 204 and opening the switches 114 causes the same or similar voltage differential to be applied to multiple sets of windings of the motor 108 so that the motor 108 can provide a torque sufficient for driving a vehicle. In some embodiments, the switches 114 and 204 are each controlled by one or more controllers or processors (e.g., the processor 702, which is described with respect to FIG. 7). For example, the one or more controllers or processors switch the electrical system to the charging mode at a first time for transferring the electrical power from the electrical power source to the one or more devices, and to the drive mode at a second time that is distinct from the first time for allowing the motor 108 to be used for driving a vehicle.

Figure 4:
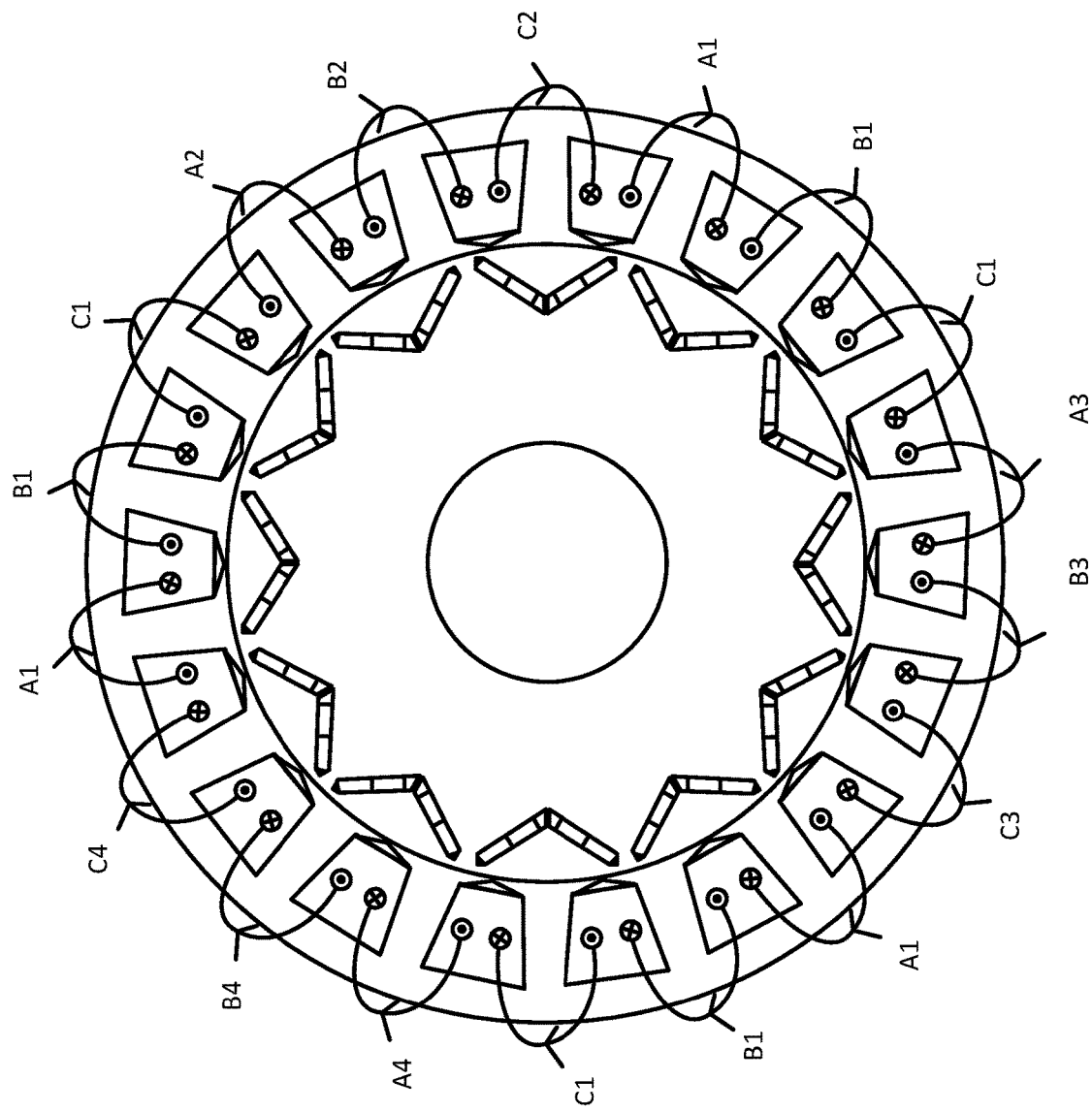
FIG. 4 is a schematic diagram illustrating an example stator of a polyphase motor in accordance with some embodiments.

FIG. 4 is a schematic diagram illustrating a stator of a polyphase motor in accordance with some embodiments. The stator shown in FIG. 4 has multiple sets of windings. As an example, a first set of windings (A1, B1, and C1) receives three phases from the DC-to-AC converter and cause a rotation of a rotor. In some embodiments, a second set of windings (A2, B2, and C2) is coupled to the AC-to-DC converter 110-1, a third set of windings (A3, B3, and C3) is coupled to the AC-to-DC converter 110-2, and a fourth set of windings (A4, B4, and C4) is coupled to the AC-to-DC converter 110-3. As shown in FIG. 4, the first set of windings is electrically isolated from the second set, third set, and fourth set of windings. In some embodiments, the first set, second set, third set, and fourth set of windings are electrically isolated from one another (e.g., DC signals applied to the first set of windings are suppressed from transmission to the second set, third set, or fourth set of windings). Although the first set, second set, third set, and fourth set of windings are electrically isolated from one another, the first set, second set, third set, and fourth set of windings are magnetically coupled so that the rotation of the rotor by the first set of windings generates electrical output through the second set, third set, and fourth set of windings.

As shown in FIG. 4, the number of windings in the first set of windings may be different from (e.g., greater than) the number of windings in the second set, third set, or fourth set of windings.

Figure 5:
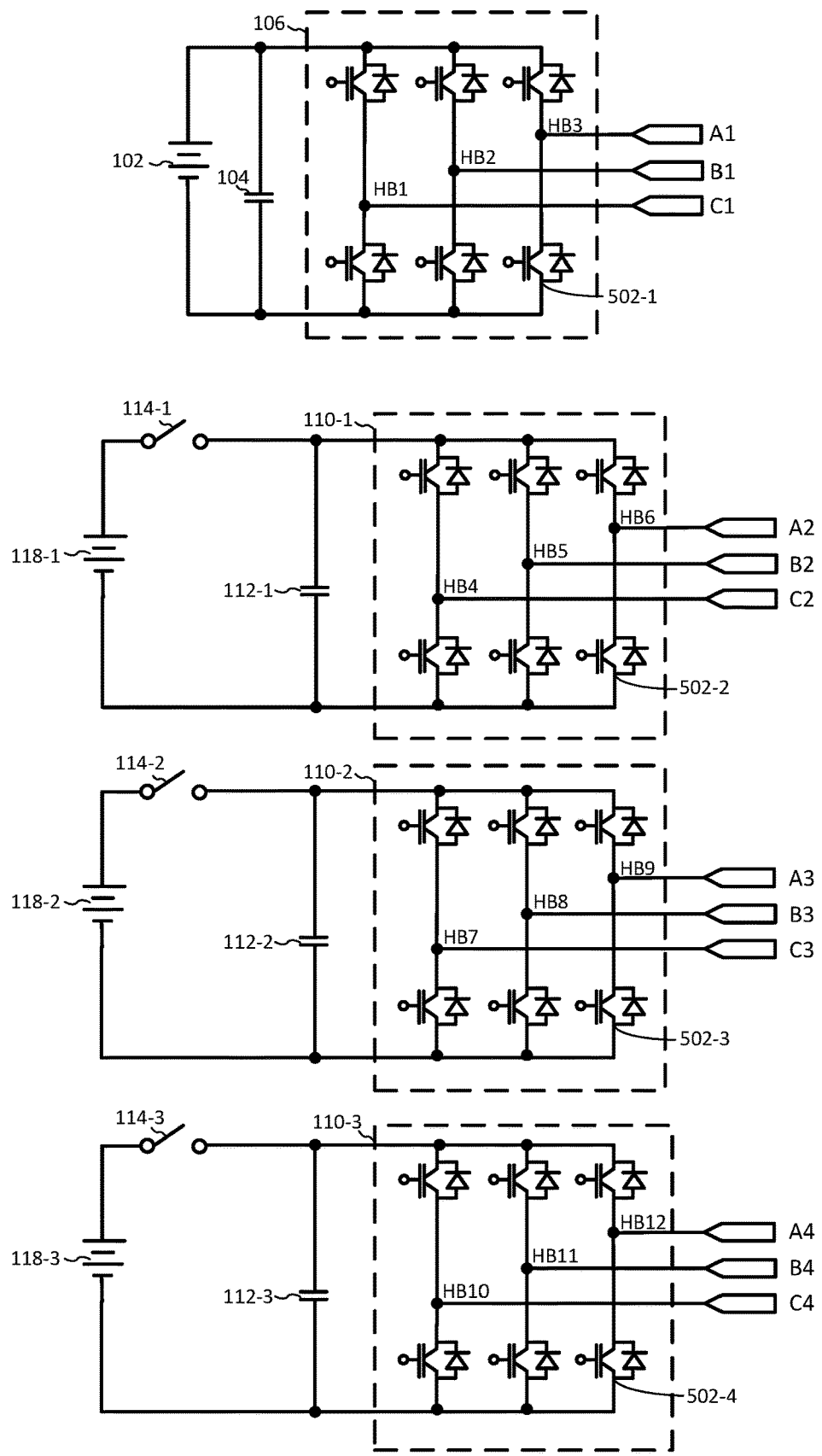
FIG. 5 is a schematic diagram illustrating example stator connections to converters in accordance with some embodiments.

FIG. 5 is a schematic diagram illustrating stator connections to converters in accordance with some embodiments. In FIG. 5, the DC-to-AC converter 106 includes a three half-bridge switch network using a set of transistors 502-1 (such as insulated-gate bipolar transistor, metal-oxide-semiconductor field-effect transistor, etc.) and coupled at HB1, HB2, and HB3 to the first set of windings (A1, B1, and C1). Similarly, in FIG. 5, the AC-to-DC converter 110-1 in FIG. 5 includes a three half-bridge switch network using a set of transistors 502-2 coupled at HB4, HB5, and HB6 to the second set of windings (A2, B2, and C2); the AC-to-DC converter 110-2 includes a three half-bridge switch network using a set of transistors 502-3 and coupled at HB7, HB8, and HB9 to the third set of windings (A3, B3, and C3); and the AC-to-DC converter 110-3 includes a three half-bridge switch network using a set of transistors 502-4 and coupled at HB10, HB11, and HB12 to the fourth set of windings (A4, B4, and C4). In some embodiments, the AC-to-DC converters 110 operate in current control mode to charge the capacitors 112 and independently control current provided to destination ESSs 118. In some embodiments, the sets of transistors 502-1, 502-2, 502-3, and 502-3 include different types of transistors (e.g., MOSFET, IGBT, etc.) within the sets and/or between sets. In some embodiments, the sets of transistors 502-1, 502-2, 502-3, and 502-3 include transistors with different properties (e.g., different sizes, doping amounts, etc.) within the sets and/or between sets.

As can be seen from FIGS. 1-5, the symmetry between the DC-to-AC converter 106 and the AC-to-DC converter 110 allow bi-directional energy transfer (e.g., the energy may be transferred from a first electrical vehicle to a second electrical vehicle, and back from the second electrical vehicle to the first electrical vehicle).

Figure 6A:
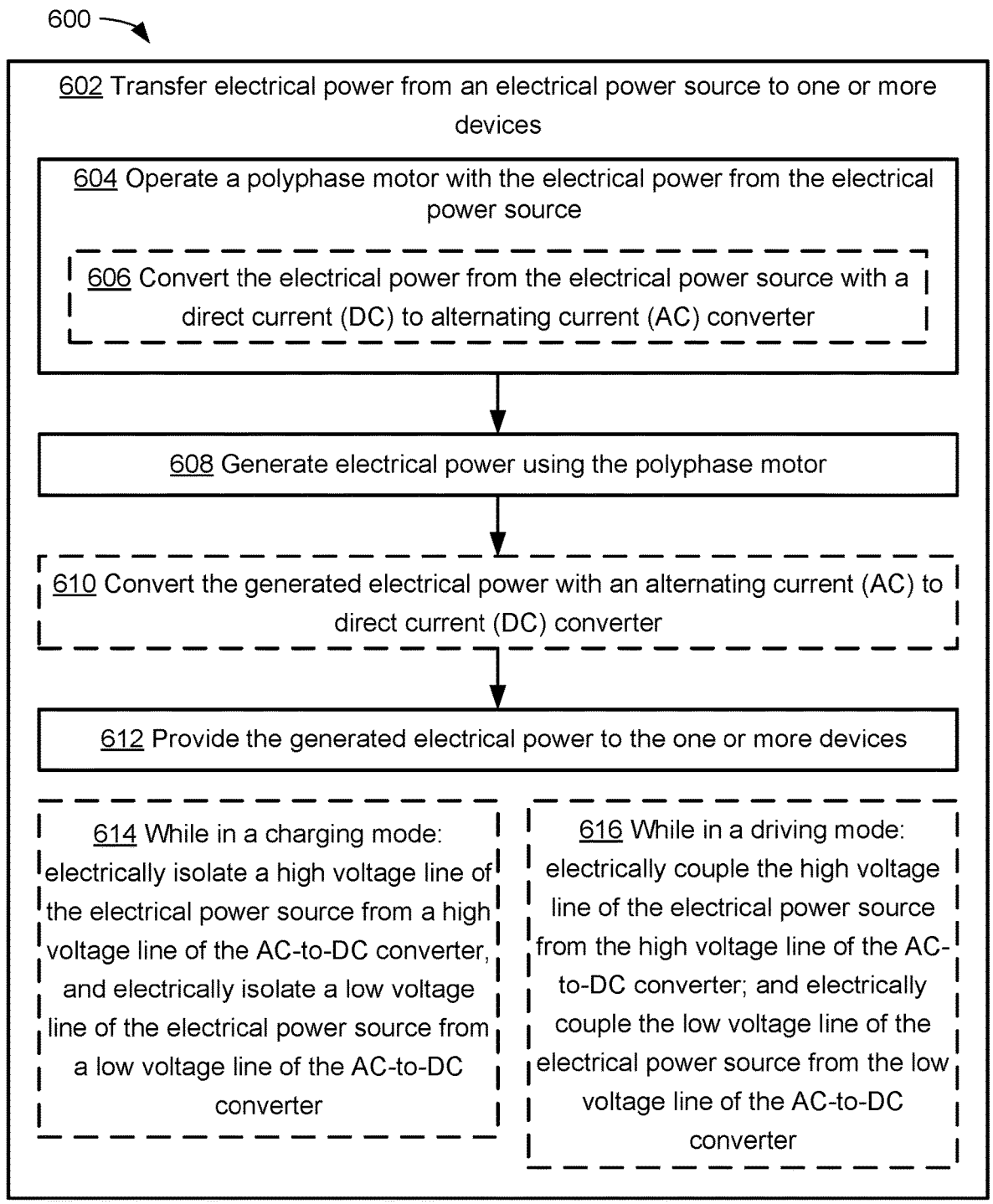
FIGS. 6A-6B are flow diagrams illustrating example methods of transferring electrical power in accordance with some embodiments.

FIG. 6A is a flow diagram illustrating a method 600 of transferring electrical power in accordance with some embodiments. The method 600 may be performed at a charging system (e.g., the charging system 700 in FIG. 7). In some embodiments, the charging system comprises the electrical system 100. In some embodiments, the charging system includes one or more processors (e.g., the processor(s) 702) and memory (e.g., the memory 708) storing instructions for execution by the one or more processors. In some embodiments, the method 600 is performed by executing instructions stored in the memory (e.g., the memory 708) of the charging system. In some embodiments, the method 600 is performed by a combination of an electrical system and one or more controllers or control circuitry.

In some embodiments, the charging system is included in a first electrical vehicle. For example, the electrical system may be used to transfer energy from one electrical vehicle to another electrical vehicle (or multiple electrical vehicles).

In some embodiments, the charging system is part of an electrical charging station. For example, the electrical system may be used to transfer energy from a charging station to an electrical vehicle (or multiple electrical vehicles).

The charging system transfers (602) electrical power from an electrical power source (e.g., the energy source 102) to one or more devices (e.g., the destination ESSs 118). Transferring the electrical power includes operating (604) a polyphase motor (e.g., the motor 108) with the electrical power from the electrical power source, generating (608) electrical power using the polyphase motor, and providing (612) the generated electrical power to the one or more devices (e.g., the destination ESSs 118).

In some embodiments, the one or more devices include a second electrical vehicle. For example, the electrical power is provided to the second electrical vehicle for charging the second electrical vehicle. In some embodiments, the one or more devices include another electrical charging station (e.g., a second electrical charging station may be charged from a first electrical charging station or an electrical vehicle).

In some embodiments, the charging system converts (606) the electrical power from the electrical power source with a direct current (DC) to alternating current (AC) converter (e.g., the converter 106). In some embodiments, the DC-to-AC converter comprises a half-bridge switch network. In some embodiments, the charging system converts (610) the generated electrical power with an alternating current (AC) to direct current (DC) converter (e.g., the converter 110). In some embodiments, the AC-to-DC converter comprises a half-bridge switch network.

In some embodiments, the charging system, while in a charging mode: electrically isolates (614) a high voltage line of the electrical power source from a high voltage line of the AC-to-DC converter (e.g., by opening the switches 204-1, 204-3, and 204-5 as shown in FIG. 2); and electrically isolates a low voltage line of the electrical power source from a low voltage line of the AC-to-DC converter (e.g., by opening the switches 204-2, 204-4, and 204-6 as shown in FIG. 2). In some embodiments, while in the charging mode, the charging system prevents DC current flow between the electrical source and the one or more devices (e.g., by opening the switches 204).

In some embodiments, the charging system, while in a driving mode: electrically couples (616) the high voltage line of the electrical power source from the high voltage line of the AC-to-DC converter (e.g., by closing the switches 204-1, 204-3, and 204-5 as shown in FIG. 3); and electrically couples the low voltage line of the electrical power source from the low voltage line of the AC-to-DC converter (e.g., by closing the switches 204-2, 204-4, and 204-6 as shown in FIG. 3).

In some embodiments, the one or more processors cause the charging system to provide the generated electrical power having a constant voltage to the one or more devices. In some embodiments, the one or more processors cause the charging system to provide the generated electrical power having a constant current to the one or more devices.

In some embodiments, the one or more processors are configured to perform handshaking communications between two vehicles (or among three or more vehicles). For example, in some embodiments, the one or more processors are configured to receive charging information (e.g., available charge level, voltage, and/or current) associated with the electrical power source and charging information (e.g., requested charge level, voltage, and/or current) associated with the one or more devices. In some embodiments, the one or more processors are configured to control the operation (604) of the polyphase motor and/or the generation (608) of the electrical power using the polyphase motor based on the charging information associated with the electrical power and the charging information associated with the one or more devices. For example, the one or more processors may control the operation of the polyphase motor and/or the generation of the electrical power using the polyphase motor to provide the electrical power based on the requested current level and the available charge level of the electrical power source.

In some embodiments, the one or more processors are configured to control the transfer of the electrical power (e.g., regulate the current) during the transfer of the electrical power from the electrical power source to the one or more devices. For example, in some embodiments, the one or more processors control the transfer of the electrical power from the electrical power source to the one or more devices based on the charging information associated with the electrical power source and/or the charging information associated with the one or more devices (e.g., the one or more processors change the current level based on the charge level of the one or more devices, such as during the start or shutdown of the transfer of the electrical power).

Figure 6B:
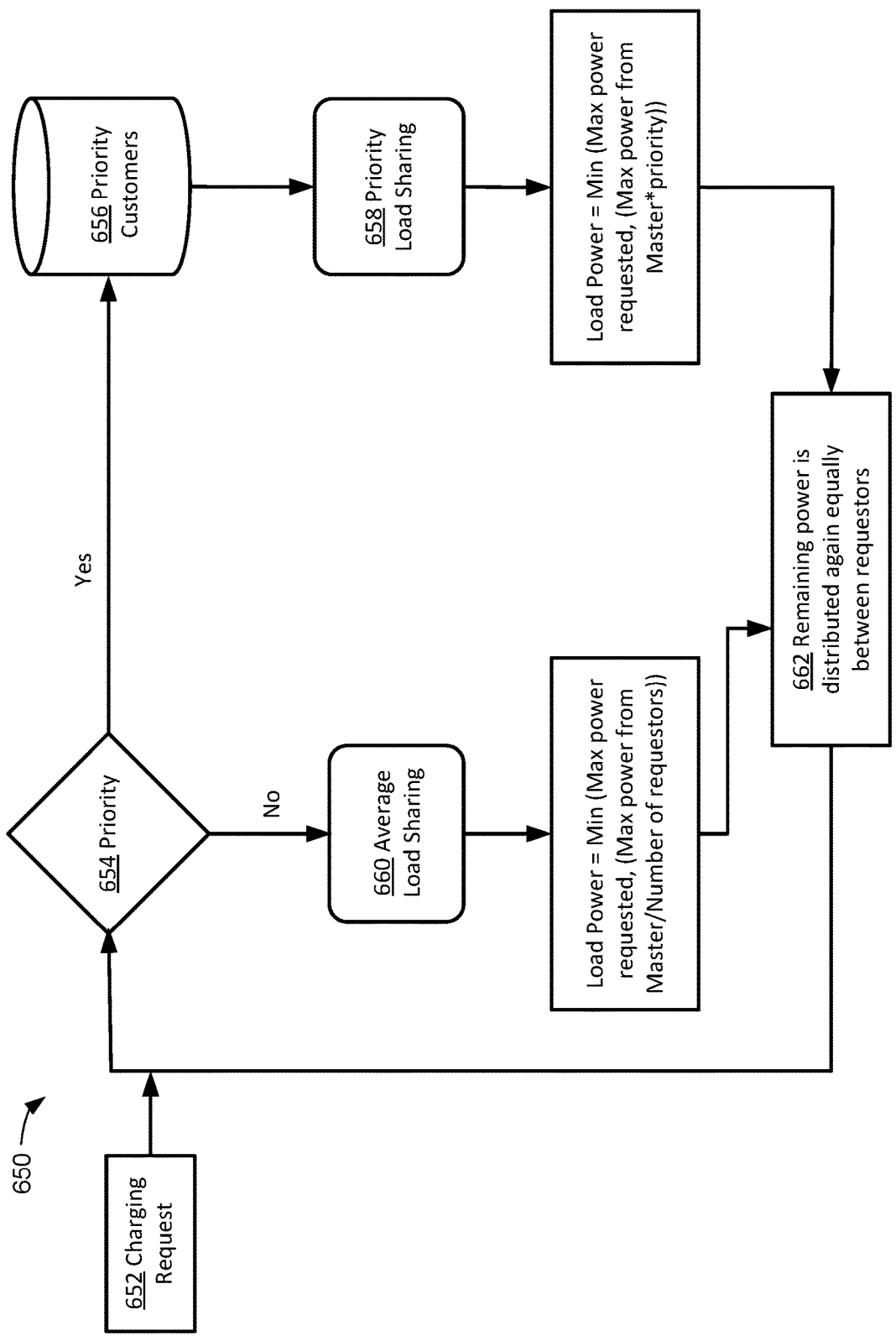

FIG. 6B is a flow diagram illustrating a method 650 of transferring electrical power in accordance with some embodiments. The method 650 may be performed at a charging system (e.g., the charging system 700 in FIG. 7). In some embodiments, the charging system comprises the electrical system 100. In some embodiments, the charging system includes one or more processors (e.g., the processor(s) 702) and memory (e.g., the memory 708) storing instructions for execution by the one or more processors. In some embodiments, the method 650 is performed by executing instructions stored in the memory (e.g., the memory 708) of the charging system. In some embodiments, the method 650 is performed by a combination of an electrical system and one or more controllers or control circuitry.

The charging system receives (652) a charging request. In some embodiments, the charging request is received in accordance with a destination ESS being connected to the charging system. In some embodiments, the charging request is received as part of establishing a charging session. In some embodiments, the source and destination systems establish a power transfer session before power transfer begins. In some embodiments, establishing the power transfer session includes performing a handshake (e.g., agreeing on a set of parameters for the power transfer). In some embodiments, the set of parameters include target power or energy requested, charge power level, charge duration, authorization, and payment. In some embodiments, the power transfer session is established in response to the source (or master) ESS detecting a coupled destination (or slave) ESS. In some embodiments, establishing the power transfer session includes determining priority for a destination ESS.

The charging system determines (654) a priority for the charging request. In some embodiments, the priority is based on request timing (e.g., first request gets first priority). In some embodiments, the priority is based on one or more parameters of the set of parameters (e.g., the power level requested).

In some embodiments, in accordance with the charging system determining that the charging request is a priority request, the charging system denotes (656) or assigns the requestor as a priority customer. In some embodiments, the charging system assigns a priority number to the charging request. For example, a priority number is assigned that is proportional to a payment rate the requestor has agreed to pay.

The charging system assigns (658) the charging request to priority load sharing in accordance with the charging system determining that the charging request is a priority request. In some embodiments, the priority load sharing is based on a priority number assigned to the charging request. In some embodiments, the load power assigned to a priority charging request the minimum of (i) the maximum power requested by the charging request, and (ii) the maximum power provided by the charging system multiplied by the priority number. For example, if the charging system is able to deliver 100 kilowatts and the charging request has a priority number of 0.5, the load power is equal to 100*0.5=50 kilowatts (or it is equal to the requested amount if the requested amount is less than 50 kilowatts).

The charging system assigns (660) the charging request to an average load sharing in accordance with the charging system determining that the charging request is not a priority request. In some embodiments, the load power assigned to the non-priority charging request is the minimum of (i) the maximum power requested by the charging request, and (ii) the maximum power provided by the charging system divided by the number of requestors. For example, if the charging system is able to deliver 100 kilowatts and there are three current requestors, the load power is equal to 100/3=33.33 kilowatts (or it is equal to the requested amount if the requested amount is less than 33.33 kilowatts).

In some embodiments, the charging system distributes (662) the remaining power (if any) again equally between requestors. For example, after assigning 50 kilowatts to a priority request, the charging system splits the remaining 50 kilowatts between two non-priority requestors (e.g., 25 kilowatts for each).

The charging system described with reference to FIGS. 6A-6B enables bi-directional transfer of DC power between an electrical source (source ESS) and one or more destination ESS (e.g., EVs). The charging system may be used by many different types of EVs that include a DC source of power (e.g., a battery system or ESS).

Although FIGS. 6A-6B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that stages could be implemented in hardware, firmware, software, or combinations thereof.

Figure 7:
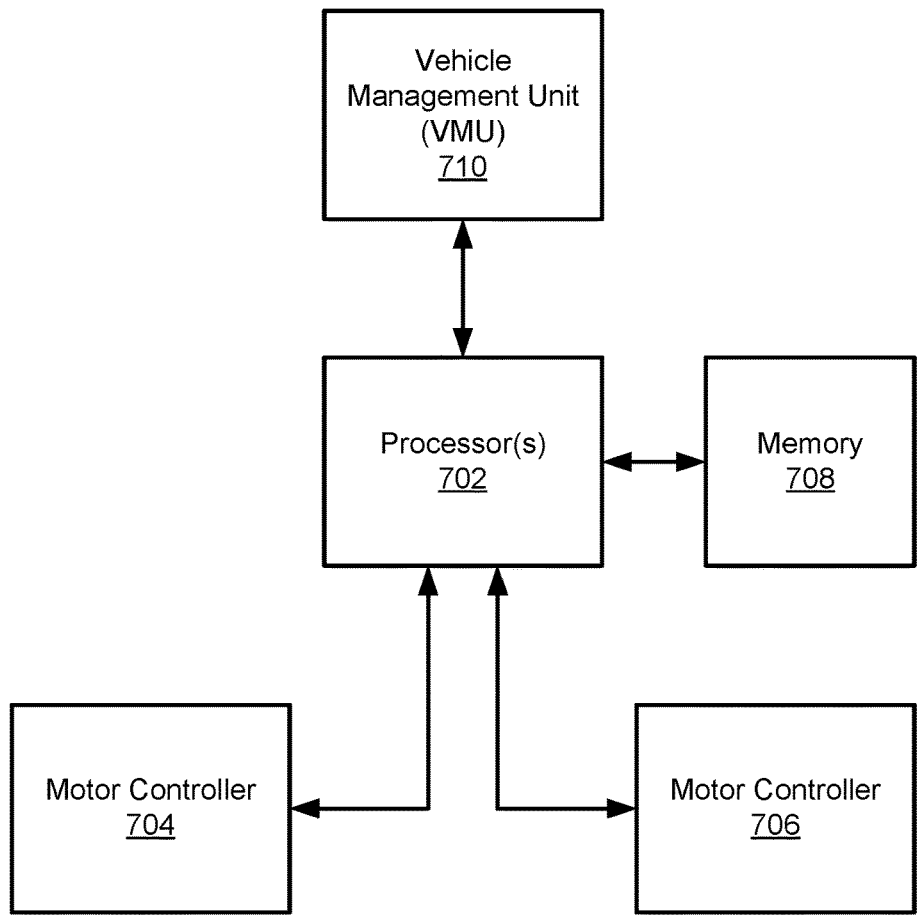
FIG. 7 is a block diagram illustrating example control circuitry in a combined on-board charging and traction system of an electric vehicle in accordance with some embodiments.

FIG. 7 is a block diagram illustrating example control circuitry in a combined on-board charging system 700 of an electric vehicle, in accordance with some embodiments. The system 700 includes one or more processors 702 (sometimes called CPUs, processing units, or hardware processors, and sometimes implemented using microprocessors, microcontrollers, or the like). In some embodiments, the processor(s) 702 control the operation of one or more components of the charging system, such as the switches, the inverter (e.g., the switching of the transistors of the inverter), and/or the converters (e.g., the switching of the transistors of the converter). In some embodiments, the system 700 includes memory 708 (e.g., electrically coupled to the processor(s) 702). In some embodiments, the memory 708 includes a non-transitory computer-readable storage medium. In some embodiments, the memory 708 stores programs, modules, and data structures that provide instructions for implementing respective operations in the methods described earlier in various embodiments.

In some embodiments, the system 700 includes a motor controller 704 and/or a motor controller 706. In some embodiments, the motor controller 704 is coupled to and controls the operation of a first motor (e.g., the motor 108). In some embodiments, the motor controller 706 is coupled to and controls the operation of a second motor. In some embodiments, the motor controller 704 and/or the motor controller 706 are implemented using microprocessors, microcontrollers, or the like. In some embodiments, the motor controller 704 and the motor controller 706 are coupled to and communicate with the processor(s) 702. In some embodiments, the motor controller 704 and the motor controller 706 receive instructions transmitted from the processor(s) 702 (e.g., instructions for motor settings such as motor speeds, torque directions (e.g., positive or negative), and/or required power levels), and, in response, the motor controller 704 and the motor controller 706 control the first and second motors, respectively, according to the instructions from the processor(s) 702.

In some embodiments, the system 700 includes a vehicle management unit (VMU) 710. In some embodiments, the VMU 710 (sometimes called an ECU or ECM) collects and analyzes information from the system 700 and/or the vehicle on which the system 700 is installed, and determines respective power settings (e.g., power levels) required for the charging and traction modes of operation. In some embodiments, the VMU 710 is coupled to and transmits information, such as instructions, to the processor(s) 702 (or to the motor controllers 704 and 706 (e.g., via the processor(s) 702)) for motor settings such as motor speeds, torque directions (e.g., positive or negative), and/or required power or current levels.

In view of these principles and examples, some example embodiments are described as follows:

(A1) In one aspect, some embodiments include an electrical system (e.g., the electrical system 100) that includes: (i) a polyphase motor (e.g., the motor 108); (ii) a direct current (DC) to alternating current (AC) converter (e.g., the DC-to-AC converter 106) electrically coupled to an electrical power source (e.g., the energy source 102) and the polyphase motor to provide electrical power from the electrical power source to the polyphase motor; and (iii) one or more AC-to-DC converters (e.g., the AC-to-DC converters 110) electrically coupled to the polyphase motor to receive electrical power from the polyphase motor. In some embodiments, the electrical system is a component of a charging system (e.g., the charging system 700). In some embodiments, the electrical system is a component of an electrical vehicle or charging station.

(A2) In some embodiments of A1, the one or more AC-to-DC converters include a first AC-to-DC converter (e.g., the AC-to-DC converter 110-1) and a second AC-to-DC converter (e.g., the AC-to-DC converter 110-2).

(A3) In some embodiments of A2, the electrical system further includes: (i) a first output switch (e.g., the switch 114-1) coupled with an output of the first AC-to-DC converter; and (ii) a second output switch (e.g., the switch 114-2) coupled with an output of the second AC-to-DC converter.

(A4) In some embodiments of any of A1-A3, the electrical system further includes a first set of one or more switches (e.g., the switches 204-1, 204-3, and 240-5) for electrically coupling a first voltage line of the electrical power source (e.g., the line 202-1) to corresponding voltage lines of the first AC-to-DC converter and the second AC-to-DC converter.

(A5) In some embodiments of A4, the first set of one or more switches includes a first connector switch (e.g., the switch 204-1) for coupling the first voltage line of the electrical power source with a corresponding voltage line of the first AC-to-DC converter.

(A6) In some embodiments of A4 or A5, the first set of one or more switches includes a second connector switch (e.g., the switch 204-3) for coupling the voltage line of the first AC-to-DC converter corresponding to the first voltage line of the electrical power source with a corresponding voltage line of the second AC-to-DC converter.

(A7) In some embodiments of any of A4-A6, the electrical system further includes a second set of one or more switches (e.g., the switches 204-2, 204-4, and 204-6) for electrically coupling a second voltage line of the electrical power source (e.g., the line 202-2) to corresponding voltage lines of the second AC-to-DC converter and the second AC-to-DC converter.

(A8) In some embodiments of A7, the second set of one or more switches includes a third connector switch (e.g., the switch 204-4) for coupling the second voltage line of the electrical power source with a corresponding voltage line of the first AC-to-DC converter.

(A9) In some embodiments of A7 or A8, the second set of one or more switches also includes a fourth connector switch (e.g., the switch 204-6) for coupling the voltage line of the first AC-to-DC converter corresponding to the second voltage line of the electrical power source with a corresponding voltage line of the second AC-to-DC converter.

(A10) In some embodiments of any of A1-A9, the electrical system further includes one or more processors (e.g., the processor(s) 702) coupled with one or more switches (e.g., the switches 204 and/or the switches 114) for switching the one or more switches between a charging mode and a driving mode.

(A11) In some embodiments of any of A1-A10, the polyphase motor includes a first set of windings electrically coupled with the DC-to-AC converter (e.g., A1, B1, and C1 in FIG. 4) and a second set of windings electrically coupled with the one or more AC-to-DC converters (e.g., A2, B2, and C2 in FIG. 4), where the second set of windings is electrically isolated from the first set of windings.

(A12) In some embodiments of any of A1-A11: (i) the second set of windings is electrically coupled with the first AC-to-DC converter; (ii) the polyphase motor includes a third set of windings (e.g., A3, B3, and C3 in FIG. 4) electrically coupled with the second AC-to-DC converter; and (iii) the third set of windings is electrically isolated from the first set of windings and the second set of windings.

(A13) In some embodiments of any of A1-A12, the one or more AC-to-DC converters include a third AC-to-DC converter (e.g., the AC-to-DC converter 110-3).

(A14) In some embodiments of A13, the polyphase motor includes a fourth set of windings (e.g., A4, B4, and C4 in FIG. 4) electrically coupled with the third AC-to-DC converter.

(B1) In another aspect, some embodiments include a method (e.g., the method 600) for transferring an electrical power from an electrical power source (e.g., the energy source 102) to one or more devices (e.g., the destination ESSs 118) by: (i) operating a polyphase motor (e.g., the motor 108) with the electrical power from the electrical power source; (ii) generating electrical power using the polyphase motor; and (iii) providing the generated electrical power to the one or more devices.

(B2) In some embodiments of B1, the electrical power source is included in a first electrical vehicle.

(B3) In some embodiments of B1, the electrical power source is part of an electrical charging station.

(B4) In some embodiments of any of B1-B3, the one or more devices include a second electrical vehicle.

(B5) In some embodiments of any of B1-B4, the method further includes: (i) converting the generated electrical power with an alternating current (AC) to direct current (DC) converter (e.g., the converter 106); and (ii) while in a charging mode: (a) electrically isolating a high voltage line of the electrical power source from a high voltage line of the AC-to-DC converter (e.g., by opening the switch 204-1); and (b) electrically isolating a low voltage line of the electrical power source from a low voltage line of the AC-to-DC converter (e.g., by opening the switch 204-2). For example, FIG. 2 shows an electrical system in a charging mode and the energy source 102 electrically isolated from the AC-to-DC converters 110.

(B6) In some embodiments of any of B1-B5, the method further includes, while in a driving mode: (i) electrically coupling the high voltage line of the electrical power source from the high voltage line of the AC-to-DC converter; and (ii) electrically coupling the low voltage line of the electrical power source from the low voltage line of the AC-to-DC converter. For example, FIG. 3 shows an electrical system in a driving mode and the energy source 102 electrically coupled to the AC-to-DC converters 110.

It will also be understood that, although the terms "first," "second," etc. may be used herein to describe various elements, these elements should not be limited by these terms. These terms are only used to distinguish one element from another. For example, a first converter could be termed a second converter, and, similarly, a second converter could be termed a first converter, without changing the meaning of the description, so long as all occurrences of the "first converter" are renamed consistently and all occurrences of the second converter are renamed consistently. The first converter and the second converter are both converters, but they are not the same converter, unless the context clearly indicates otherwise.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the phrase "at least one of A, B and C" is to be construed to require one or more of the listed items, and this phase reads on a single instance of A alone, a single instance of B alone, or a single instance of C alone, while also encompassing combinations of the listed items such as "one or more of A and one or more of B without any of C," and the like.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electrical system, comprising:
a polyphase motor comprising two or more sets of fixed windings isolated from one another in a drive mode and a charging mode;
a direct current (DC) to alternating current (AC) converter electrically coupled to an electrical power source and the polyphase motor to provide electrical power from the electrical power source to the polyphase motor; and
two or more AC-to-DC converters electrically coupled to respective sets of fixed windings of the two or more sets of fixed windings of the polyphase motor to receive electrical power from the polyphase motor, wherein the two or more AC-to-DC converters are electrically isolated from one another.

2. The electrical system of claim 1, further comprising:
a first output switch coupled with an output of a first AC-to-DC converter of the two or more AC-to-DC converters; and
a second output switch coupled with an output of a second AC-to-DC converter of the two or more AC-to-DC converters.

3. The electrical system of claim 2, further comprising:
a first set of one or more switches for electrically coupling a first voltage line of the electrical power source to corresponding voltage lines of the first AC-to-DC converter and the second AC-to-DC converter.

4. The electrical system of claim 3, wherein:
the first set of one or more switches includes a first connector switch for coupling the first voltage line of the electrical power source with a corresponding voltage line of the first AC-to-DC converter.

5. The electrical system of claim 4, wherein:
the first set of one or more switches also includes a second connector switch for coupling the voltage line of the first AC-to-DC converter corresponding to the first voltage line of the electrical power source with a corresponding voltage line of the second AC-to-DC converter.

6. The electrical system of claim 5, further comprising:
a second set of one or more switches for electrically coupling a second voltage line of the electrical power source to corresponding voltage lines of the second AC-to-DC converter and the second AC-to-DC converter.

7. The electrical system of claim 6, wherein:
the second set of one or more switches includes a third connector switch for coupling the second voltage line of the electrical power source with a corresponding voltage line of the first AC-to-DC converter.

8. The electrical system of claim 7, wherein:
the second set of one or more switches also includes a fourth connector switch for coupling the voltage line of the first AC-to-DC converter corresponding to the second voltage line of the electrical power source with a corresponding voltage line of the second AC-to-DC converter.

9. The electrical system of claim 1, further comprising:
one or more processors coupled with one or more switches for switching the one or more switches between the charging mode and the driving mode, wherein the two or more AC-to-DC converters are electrically coupled to respective sets of fixed windings of the two or more sets of fixed windings of the polyphase motor in a same manner in each of the charging mode and the driving mode.

10. The electrical system of claim 1, wherein:
the polyphase motor includes a first set of windings electrically coupled with the DC-to-AC converter and a second set of windings electrically coupled with the two or more AC-to-DC converters, wherein the second set of windings is electrically isolated from the first set of windings.

11. The electrical system of claim 10, wherein:
the second set of windings is electrically coupled with a first AC-to-DC converter of the two or more AC-to-DC converters;
the polyphase motor includes a third set of windings electrically coupled with a second AC-to-DC converter of the two or more AC-to-DC converters; and
the third set of windings is electrically isolated from the first set of windings and the second set of windings.

12. The electrical system of claim 11, wherein:
the two or more AC-to-DC converters include a third AC-to-DC converter; and
the polyphase motor includes a fourth set of windings electrically coupled with the third AC-to-DC converter.

13. The electrical system of claim 1, wherein a respective priority is assigned to each of the two or more AC-to-DC converters.

14. The electrical system of claim 1, wherein the two or more AC-to-DC converters are bidirectional converters configured for bidirectional transfer of electrical power to and from the polyphase motor.

15. A method, comprising:
transferring an electrical power from an electrical power source to two or more devices by:
operating a polyphase motor with the electrical power from the electrical power source, wherein the polyphase motor is coupled to the electrical power source via a first set of fixed windings of three or more sets of fixed windings; and
generating electrical power using the polyphase motor and providing the generated electrical power to the two or more devices, wherein the two or more devices are coupled to the polyphase motor via respective AC-to-DC converters coupled to respective sets of fixed windings of the three or more sets of fixed windings of the polyphase motor other than the first set of fixed windings, and wherein the respective sets of fixed windings are electrically isolated from one another and from the first set of fixed windings.

16. The method of claim 15, wherein:
the electrical power source is included in a first electrical vehicle.

17. The method of claim 15, wherein:
the electrical power source is part of an electrical charging station.

18. The method of claim 15, wherein:
the one or more devices include a second electrical vehicle.

19. The method of claim 15, further comprising:
converting the generated electrical power with an alternating current (AC) to direct current (DC) converter, wherein the method includes:
while in a charging mode:
electrically isolating a high voltage line of the electrical power source from a high voltage line of the AC-to-DC converter; and
electrically isolating a low voltage line of the electrical power source from a low voltage line of the AC-to-DC converter.

20. The method of claim 19, further comprising:
while in a driving mode:
electrically coupling the high voltage line of the electrical power source from the high voltage line of the AC-to-DC converter; and
electrically coupling the low voltage line of the electrical power source from the low voltage line of the AC-to-DC converter.

* * * * *